(12) United States Patent
Refstrup et al.

(10) Patent No.: US 8,705,052 B2
(45) Date of Patent: Apr. 22, 2014

(54) COMMUNICATING STATE DATA TO A NETWORK SERVICE

(75) Inventors: Jacob Refstrup, Vancouver, WA (US); Loren D Chapple, Vancouver, WA (US); Venugopal Srinivasmurthy K, Bangalore (IN); Sudhindra Venkatesh Kulkarni, Bangalore (IN); Hitesh Amrutlal Bosamlya, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 906 days.

(21) Appl. No.: 12/759,856

(22) Filed: Apr. 14, 2010

(65) Prior Publication Data

US 2011/0255123 A1   Oct. 20, 2011

(51) Int. Cl.
*G06F 3/12* (2006.01)
(52) U.S. Cl.
USPC ........... 358/1.1; 358/1.13; 358/1.15; 715/762
(58) Field of Classification Search
USPC .......................... 358/1.13–1.15, 1.1; 715/762
See application file for complete search history.

(56) References Cited

U.S. PATENT DOCUMENTS

| | | | |
|---|---|---|---|
| 7,424,459 B2* | 9/2008 | Bodmer et al. | 705/64 |
| 8,239,239 B1* | 8/2012 | Malhotra et al. | 705/7.27 |
| 2003/0115548 A1* | 6/2003 | Melgar | 715/513 |
| 2003/0172141 A1* | 9/2003 | Miller et al. | 709/223 |
| 2004/0230447 A1* | 11/2004 | Schwerin-Wenzel et al. | 705/1 |
| 2006/0085781 A1* | 4/2006 | Rapp et al. | 716/17 |
| 2007/0050750 A1* | 3/2007 | Bykov et al. | 717/100 |
| 2008/0270597 A1 | 10/2008 | Tenenti | |
| 2011/0267633 A1* | 11/2011 | Srinivasmurthy K et al. | 358/1.13 |

* cited by examiner

*Primary Examiner* — Twyler Haskins
*Assistant Examiner* — Dennis Dicker
(74) *Attorney, Agent, or Firm* — Jack H. McKinney

(57) ABSTRACT

An apparatus includes an interface builder, template engine, and an assembler. The template engine is operable to identify a reference template associated with an object selected from a first user interface. The assembler is operable to assemble a request from the identified reference template and state data corresponding to the reference template. The builder is operable to process a user interface description retrieved using the request to cause the display of a second user interface.

18 Claims, 5 Drawing Sheets

COMMUNICATING STATE DATA TO A NETWORK SERVICE

BACKGROUND

Peripheral devices such as printers can be configured to communicate directly with the internet. With this ability, functions that would otherwise be provided by processing components of the device can now be provided by a network service. To effectively provide those functions, the network service, in many cases, utilizes device state data. This state data can identify things such as device capabilities and operational status. When a multitude of devices rely on the network service to provide a function, obtaining and maintaining device states can prove to be an arduous task. It can strain the processing resources of the network service and consume communication bandwidth between the network service and the devices. These pitfalls can degrade the user experience by delaying when and how often a function can be provided for a given device.

DRAWINGS

Figure 7:
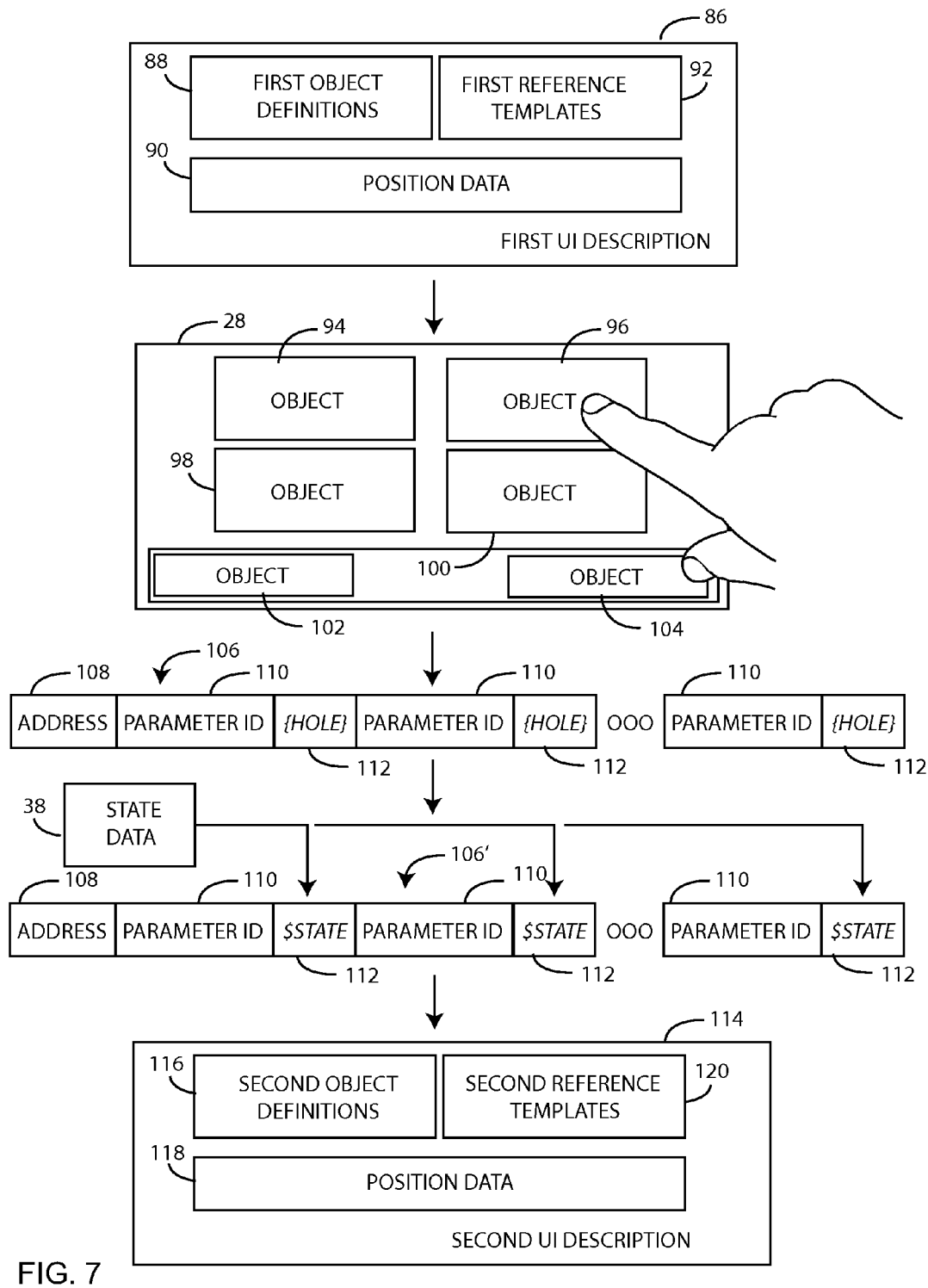

FIG. 7 graphically depicts an exemplary use of reference templates to communicate device state data according to and embodiment.

DETAILED DESCRIPTION

INTRODUCTION: Various embodiments described below were developed in an effort to allow a fleet of devices to simultaneously and repeatedly communicate state data to a network service. As will be described in detail below, the devices are configured to provide only the state information needed at a given instance. Further, the state data is provided within a reference such as an URL (Uniform Recourse Locator) that is used to request a particular function from the network service. Thus, the network service can be stateless.

A "network service" refers to a server or collection of servers that are configured to communicate with a collection of devices to fulfill intended functions. Where those devices are printers, for example, those functions can include generating and delivering print jobs to the devices. Those functions can also include, as described in more detail below, projecting user interfaces to be displayed by those devices allowing users to interact with the network service.

"State data" refers to information corresponding to the state of a device that can be used by a network service to fulfill a given function. State data can identify capabilities of the device, a user's configuration of the device, and a current navigation state of a user's interaction. For example, where the device is a printer with a touch screen display, state data can identify the existence and the dimensions of the display, whether or not the printer can produce color output, consumable levels, and the availability of a particular print media such as photo paper. State data can identify a preferred language and other regional settings. State data can also define a position within a current workflow such as a currently photo selected from a series of photos.

A "user interface" as used herein is a visual display through which a user can select from among one or more objects. An object, for example, can be a user selectable icon or a control button that is associated with a particular function to be performed. A "user interface description" is an electronic file that when processed causes the display of a particular user interface. The file, for example, may follow the XML (Extensible Markup Language) format. The file defines the objects and their placement. The file also associates a reference template with each object. A reference template is a reference such as an URL (Uniform Resource Locator) configured to be populated with state data identified by the reference template. The reference template defines a function associated with a given object. In other words, upon selection of an object, an associated reference template is populated with corresponding state data and used to make a call to a network service.

The term "job" is used to refer to data that can be processed by a device to produce a desired result or output. Where the device is a printer, a job may cause the device to produce printed output. However, the output need not be physical. For example, the output may be the display of a video or the archiving or transmission of an electronic file.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
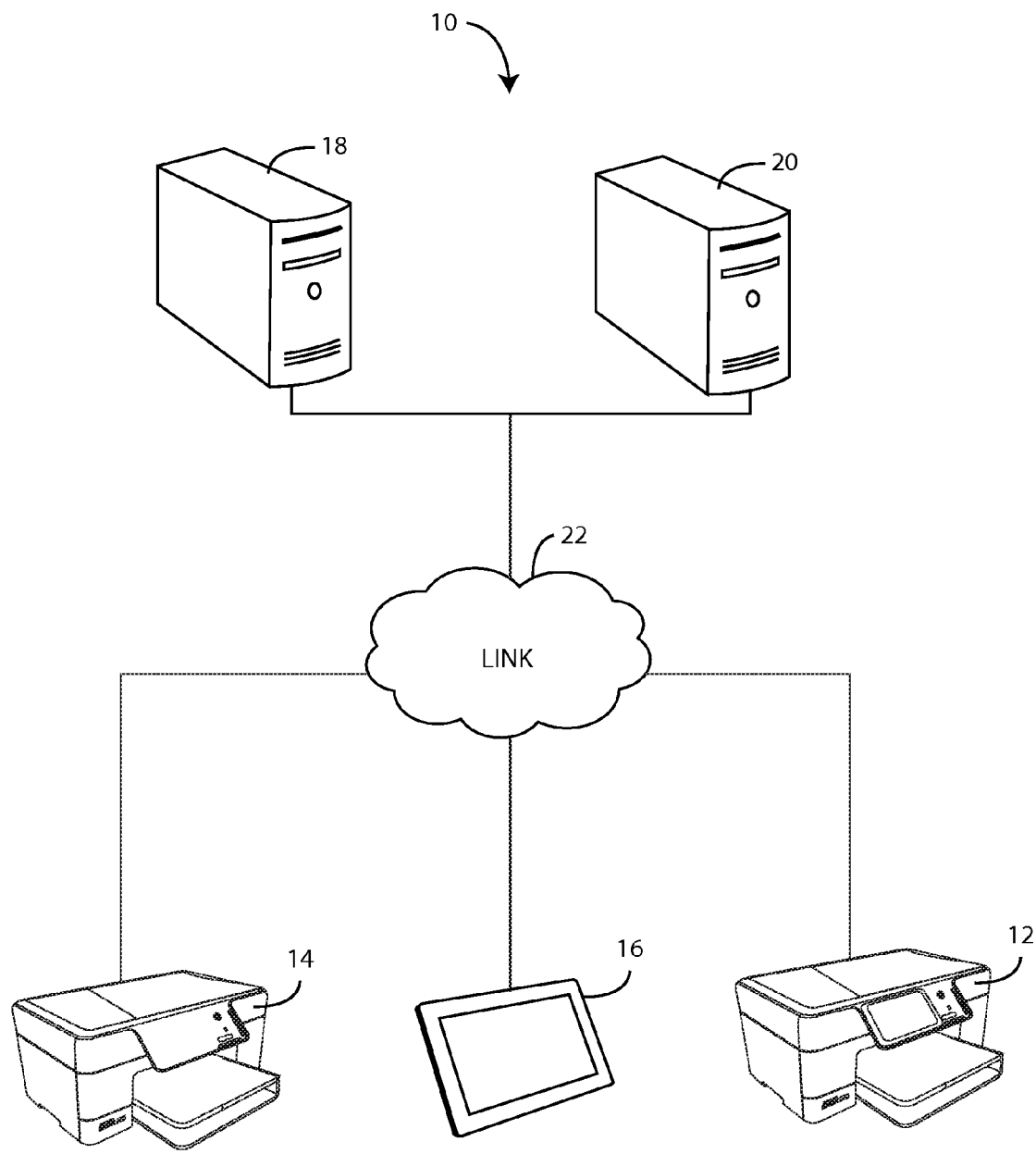
FIG. 1 depicts an exemplary environment in which various embodiments may be implemented.

ENVIRONMENT: FIG. 1 depicts an exemplary network 10 in which various embodiments may be implemented. Network 10 is shown to include devices 12, 14, and 16, job service 18, and application service 20. Devices 12-16 represent generally any electronic devices capable of communicating with one or both of application service 18 and job service 20 to request the performance of specified functions. Such functions can include the generation and delivery of jobs. In the example of FIG. 1, device 12 and 14 are printers capable of processing print jobs received from job service 18. Device 12 includes an integrated display, while device 14 does not. Device 16 is a display device that can serve as a display for device 14. Devices 12 and 14, however, need not be printers. Devices 12 and 14 may be of another device type capable of processing job to produce an output. That output may, but need not, be physical. For example, the output may be the display of a video or the archiving or transmission of an electronic file.

Job service 20 represents a network service configured to communicate jobs to devices 12 and 14. Application service 18 represents a network service configured to communicate with devices 12-16 to perform specified functions such as causing job service 18 to deliver a particular job. Where devices 12 and 14 are printers, those functions can include causing job service 20 to deliver print jobs to devices 12 and 14. The functions can also include projecting user interfaces to be displayed by devices 12 and 16. Projecting a user interface, as discussed below, involves communicating a description of the user interface to a device 12 or 16. The device 12 or 16 then processes that description to display the user interface. Through interactions with the user interface, a user can select an object or icon that represents a particular function to be performed. Where that function is to be performed by application service 20 (rather than device 12, 14, or 16), the device 12 or 16 informs application service 20 of the user's selection. Application service 20 then performs the specified function.

Components 12-20 are interconnected via link 22. Link 22 represents generally one or more of a cable, wireless, fiber optic, or remote connections via a telecommunication link, an infrared link, a radio frequency link, or any other connectors or systems that provide electronic communication. Link 22 may include, at least in part, an intranet, the Internet, or a combination of both. Link 22 may also include intermediate proxies, routers, switches, load balancers, and the like. The paths followed by link 22 between components 12-20 as depicted in FIG. 1 represent the logical communication paths between these devices, not necessarily the physical paths between the devices.

Figure 2:
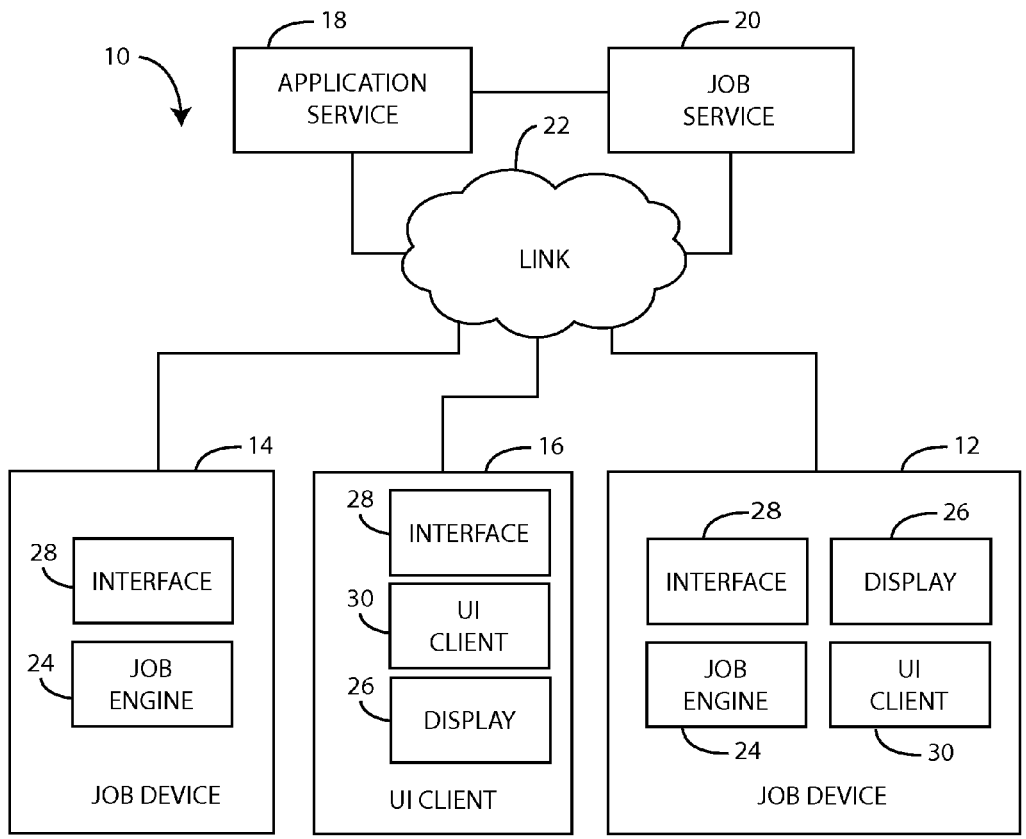
FIGS. 2-4 depict examples of various physical and logical components for implementing various embodiments.
Figure 3:
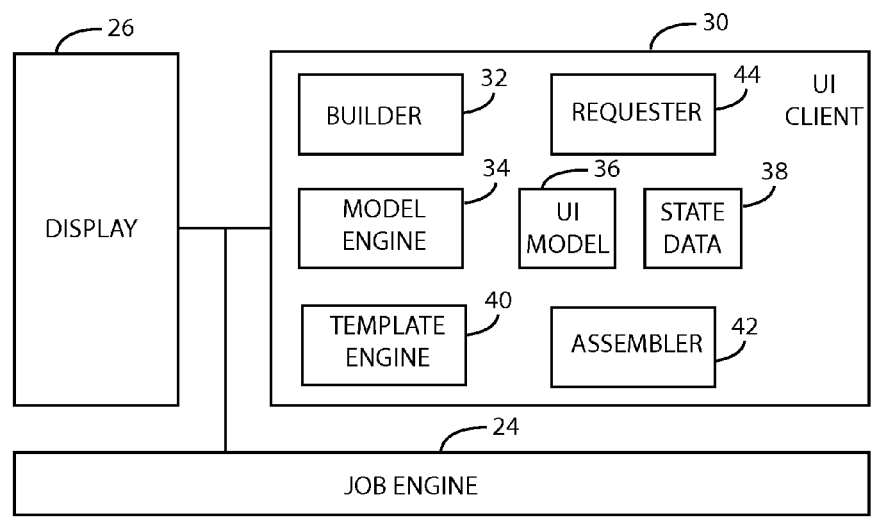
Figure 4:
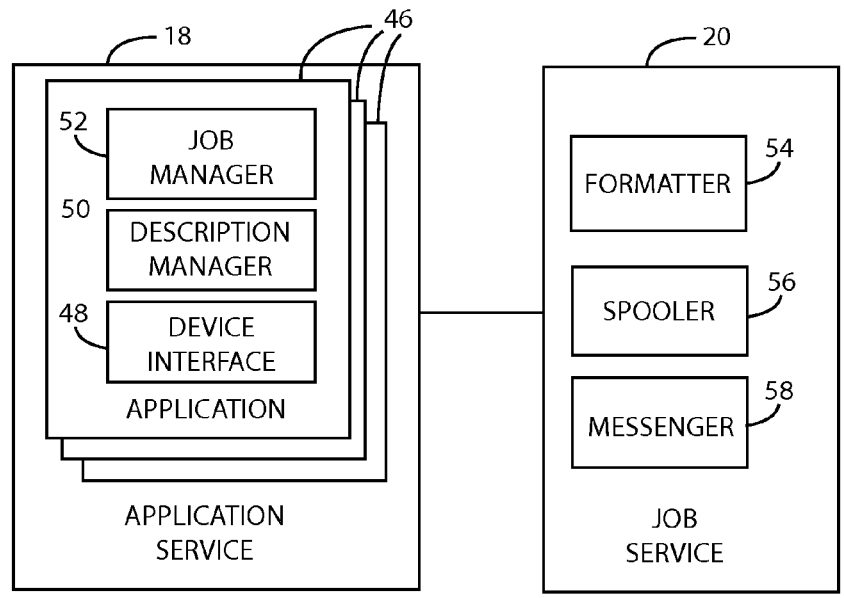

COMPONENTS: FIGS. 2-4 depict various physical and logical components for implementing various exemplary embodiments. In FIG. 2, device 12 is shown to include job engine 24, interface 26, display 28, and UI (User Interface) client 30. Device 14 is shown to include job engine 24 and interface 28, while device 16 is shown to include display 26, interface 28 and UI client 30. Job engine 24 represents generally any combination of hardware and programming configured to process a job received from job service 20 to achieve an intended result. For example, where device 12 or 14 is a printer and the job is a print job, job engine 28 is responsible for processing the print job to produce printed output. In this example, job engine 28 would include components to deposit imaging material such as ink or toner onto a media sheet.

Display 26 represents generally any display screen on which a user interface can be displayed. Display 26 may be a touch screen allowing a user to select a user interface object by touching a particular screen location. Display may not include touch capabilities, but instead have associated physical buttons that when depressed or otherwise activated correspond to the selection of user interface objects. In one example, a user interface object may be positioned adjacent to such a button. In another example, one button may be used to highlight a user interface object while another may be used to select a highlighted object.

Interface 28 represents generally any combination of hardware and programming configured to receive communications from and pass communications to application service 18 and job service 20 via link 22. In particular, interface 28 may include one or more physical ports such as a wired or wireless network port via which communications may be sent and received on more than one data channel.

UI client 30 represents generally any combination of hardware and programming configured to process a user interface description to cause the display of a user interface on display 26. UI client 30 is also responsible for detecting the selection of a user interface object, populating a reference template with corresponding state data to assemble a request, and communicating that request to application service 18 using interface 28

Moving to FIG. 3, UI client 30 is shown to include builder 32, model engine 34, UI model 36, state data 38, template engine 40, assembler 42 and requester 44. Builder 32 represents generally any combination of hardware and programming configured to process a user interface description to cause the display of a user interface on display 26. As described, a user interface description defines one or more objects and the positioning of each object. The position may be a pixel coordinate or coordinates of a display. Where objects are members of a list, the position may be a relative position of that object in the list. Thus, a user interface description may define objects in a particular order, and builder 32 may infer the position of an object based on its relative position within that order.

Model engine 34 represents generally any combination of hardware and programming configured to create UI model 36 for a current user interface description. As described above, a user interface description also defines reference templates each associated with a different object defined by that model. Each reference template identifies state data that, if available, is obtained from state data 38. UI model 36 is data associating those reference templates with objects displayed in a current user interface presented on display 28.

Template engine 40 represents generally any combination of hardware and programming configured to detect a user's selection of an object of a user interface presented on display 26. Upon detection, template engine 40 is responsible for examining UI model 36 to identify a reference template associated with the selected object. Assembler 42 represents generally any combination of hardware and programming configured to assemble a request from an identified reference template and state data corresponding to the reference template. In particular assembler 42 may examine a reference template selected by template engine 40 and populate the identified reference template with corresponding state data obtained from state date 38. Requester 44 represents generally any combination of hardware and programming configured to communicate a request assembled by assembler 42 to application service.

A reference template, for example, may include a network address for accessing a network service. Appended to the template may be parameter IDs that identify particular pieces of state data. The following is an example http://app.hp.com/app/appname/type/cards/$lang/{$lang}/category/{category}/$touch/{$touch}. The portion "app.hp.com/app/appname/type/cards" is an address for accessing a network service. Portions "$lang", "category", and "$touch" are parameter IDs, while "{$lang}", "{category}", and "{$touch}" are holes or placeholders into which state data can be inserted. An assembled request could then be: "http://app.hp.com/app/appname/type/cards/$lang/en/category/birthday/$touch/false." State data "en" has been inserted to indicate English as a user preferred or regional language. "Birthday" has been inserted to indicate a category or navigation state within a workflow. "False" has been entered to specify that the device does not have touch screen device capabilities.

Referring now to FIG. 4, application service 18 is shown to include a number of applications 46. Each application includes device interface 48, description manager 50 and job manager 52. Device interface 48 represents generally any combination of hardware and programming configured to cause devices 12 and 16 to process a user interface description to cause the display of a user interface. Such may be accomplished by communicating the user interface description to device 12 or 16 where it is processed following receipt. Device interface 48 is also responsible for receiving a request assembled by a device 12 or 16. The request is assembled from a reference template and state data corresponding to the reference template.

Description manager 50 represents generally any combination of hardware and programming configured to acquire a user interface description compatible with the state data included in a request received by device interface 48. The user interface description defines a plurality of objects and a plurality of reference templates. Each reference template is associated with a different one of the objects. To acquire a user interface description, description manager 50 may, for example, assemble the description or retrieve it from a cache. A compatible user interface description is a description that is compatible with the device that issued the request and designed to achieve a result corresponding to the request based on state data included in the request.

Job manager 52 represents generally any combination of hardware and programming configured to acquire job data corresponding to a request received by device interface 48 and cause job service 20 to process the job data to generate a job to be communicated to or on behalf of the device that issued the request. Where the requesting device is a printer, the job, for example, may be a print job.

Job service 20 is shown to include formatter 54, spooler 56, and messenger 58. Formatter 54 represents generally any combination of hardware and programming configured to process the job data received from application service 18 to generate such jobs. Where device 12 or 14 is a printer, formatter 54 may format the job data to create a print job. Such may include formatting into a format compatible for printing by device 12 or 14 or digital archiving for later access and printing. Exemplary formats include Post Script, PDL (Page Description Language), and PDF (Portable Document Format).

Spooler 56 represents generally any combination of hardware and programming configured to act as a queue for jobs and to release jobs to devices 12 and 14. Messenger interface 58 represents generally any combination of hardware and programming configured to push jobs from spooler 56 to devices 12 and 14 or to notify devices 12 or 14 when a job is ready to be delivered allowing device 12 or 14 to pull the job.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 5:
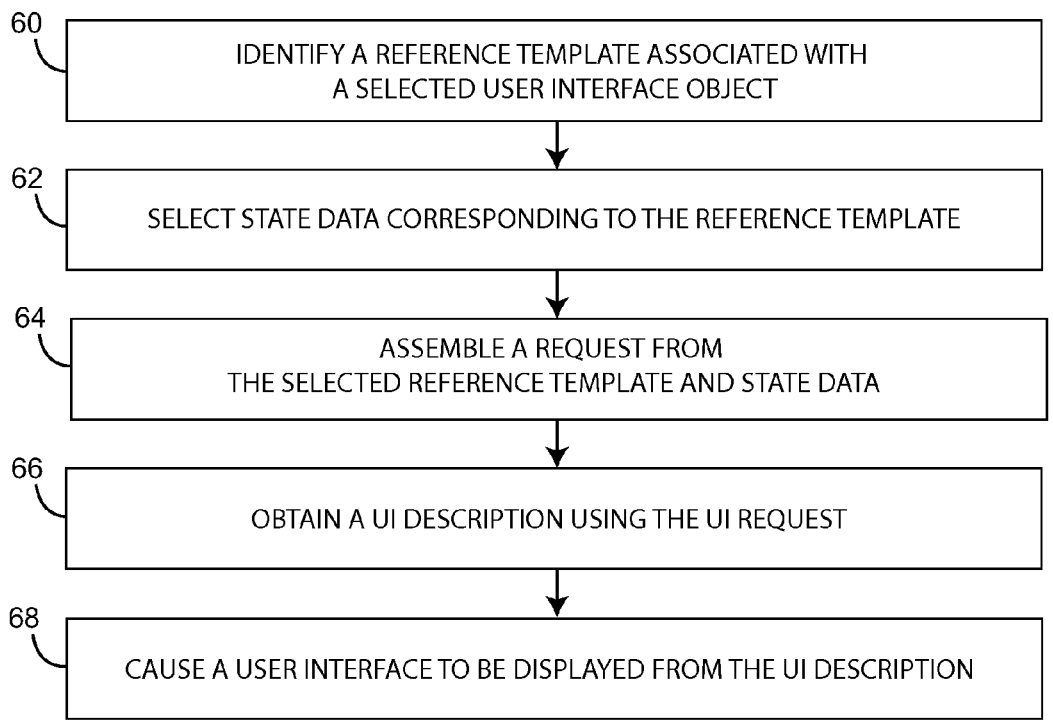
FIGS. 5-6 are exemplary flow diagrams depicting steps taken to implement various embodiments.
Figure 6:
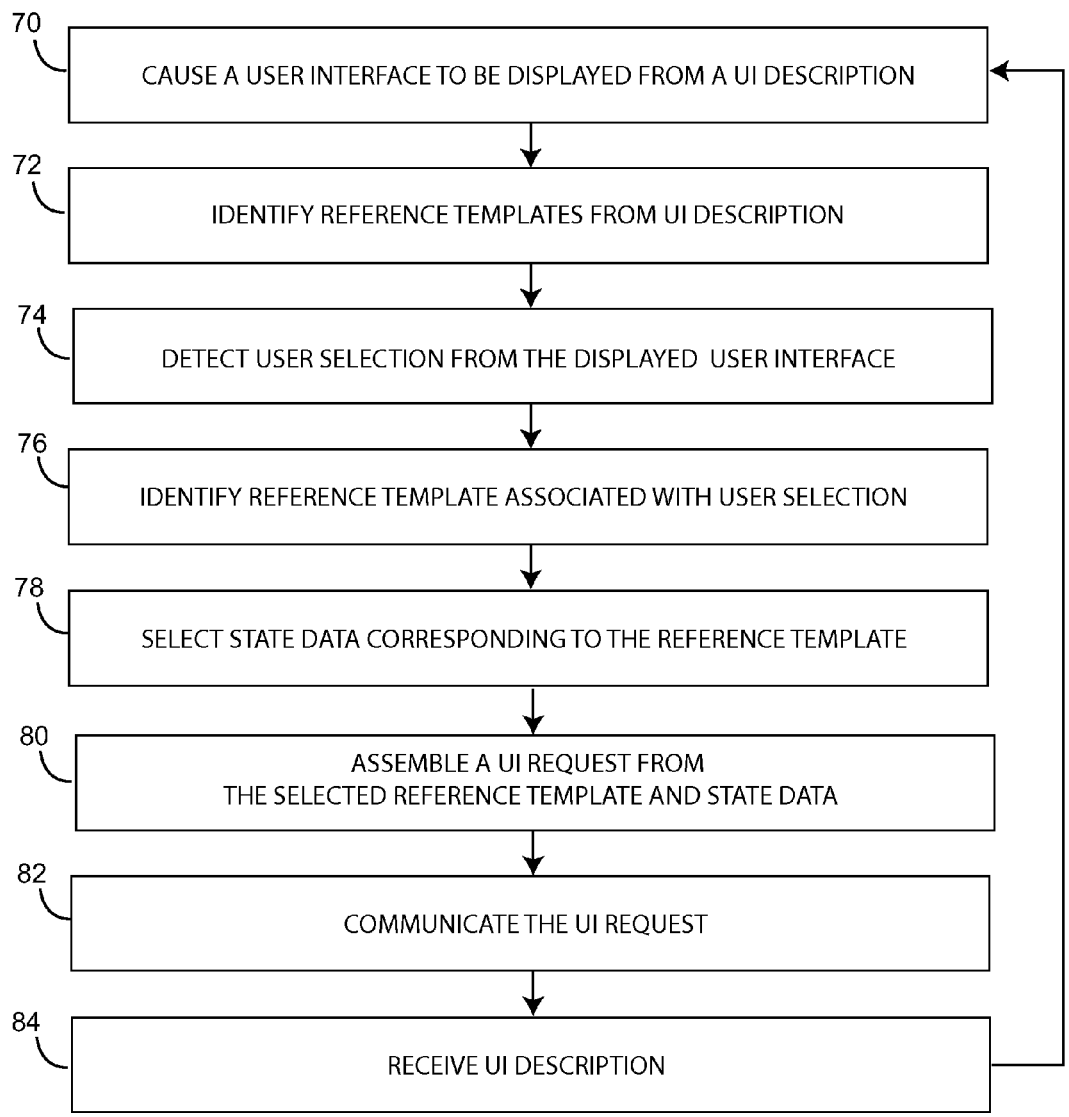

OPERATION: FIGS. 5-6 are exemplary flow diagrams of steps taken to implement various embodiments. In discussing FIGS. 5-6, reference may be made to component of FIGS. 1-4 to provide contextual examples. Implementation, however, is not limited to those examples. FIGS. 5 and 6 are taken from the perspective of device 12 or 16. Starting with FIG. 5, a reference template associated with a selected user interface object is identified (step 60). Referring back to FIG. 3, a user interface is presented on display 28. Template engine 40 detects a user's selection of an object displayed as part of that user interface. Template engine 40 then accesses UI model 36 to identify a reference template associated with the selected object.

State data corresponding to the identified reference template is then selected (step 62). As described, a reference template identifies state data. Thus, referring to FIG. 3, assembler 42 examines the identified reference template and retrieves the corresponding state data. A request is assembled from the reference template and selected state data (step 64). Referring to FIG. 3, assembler 42 is responsible for step 64. An example is discussed below with respect to FIG. 7. In general, step 64 involves populating the reference template with the selected state data.

A user interface description is obtained using the request (step 66). Referring to FIG. 3, requestor communicates the assembled request to application service 18, which, in turn, returns the user interface description. The user interface returned is selected or assembled based on the state data included in the request. A user interface is then caused to be displayed for the user interface description (step 68). Referring to FIG. 3, builder 32 receives and processes the user interface description causing display 28 to present the user interface.

In some instances, the request assembled in step 64 is a request for a network service to communicate a job. In such cases, the job is received and processed to produce an output. Referring to FIG. 3, job engine 24 is responsible receiving and processing the job. In a given example, the job may be a print job processed to produce a printed document. Further, the job may be generated utilizing state data included in the request assembled in step 64.

FIG. 6 depicts a workflow from a slightly different perspective. A user interface is caused to be displayed from a user interface description (step 70). Referring to FIG. 3, builder 32 processes the user interface description causing display 28 to present the user interface. Reference templates are identified from the user interface description (step 72). Referring back to FIG. 3, model engine 34 examines the user interface description and identifies the reference templates and the association of each reference template with an object defined by the user interface description. Using this information, model engine 34 creates UI model 36.

A user's selection from the user interface is detected (step 74). A reference template associated with the user selection is identified (step 76). Referring to FIG. 3, template engine 40 is responsible for steps 74 and 76. Template engine 40 detects a user's selection of an object displayed as part of that user interface. Template engine 40 then accesses UI model 36 to identify a reference template associated with the selected object.

State data corresponding to the identified reference template is then selected (step 78). As described, a reference template identifies state data. Thus, referring to FIG. 3, assembler 42 examines the identified reference template and retrieves the corresponding state data from state data 38. A request is assembled from the reference template and selected state data (step 80). Referring to FIG. 3, assembler 42 is responsible for step 64. An example is discussed below with respect to FIG. 7. In general, step 80 involves populating the reference template with the selected state data.

The assembled request is communicated (step 82), and a user interface description is received (step 84). Referring to FIG. 3, requestor 44 communicates the assembled request to application service 18, which, in turn, returns the user interface description received in step 84. The process then jumps back to step 70 where a subsequent user interface is caused to be displayed from the user interface description received in step 84.

FIG. 7 graphically depicts selected steps of FIGS. 5 and 6 starting with receiving first user interface description 86. In the example of FIG. 7, first user interface description 86 includes first object definitions 88, position data 90, and first reference templates 92. First object definitions 88 define the objects that are to be displayed as a part of a first user interface. Position data 90 defines the position of each object within the first user interface. Each of first reference templates 92 is associated with a different object defined by first object definitions 88.

A first user interface is presented on display 28. The first user interface includes objects 94-104 defined by first object definitions 88 and positioned on display 28 according to position data 90. In the example of FIG. 7, display 28 is a touch screen, and a user has selected object 96. From first reference templates 92, a reference template 106 associated with object 96 has been identified.

Reference template 106 includes address 108, parameter IDs 110, and holes 112. Referring to FIG. 2, address 108 may be an address for accessing a particular application present on application service 18. Parameter IDs 110 each identify a different piece of state data. Each hole 112 represents a position or placeholder for populating reference template 106 with state data corresponding to a given parameter ID 106.

Continuing, request 106' has been assembled by populating reference template 106 with corresponding state data 38. Request 106' is then communicated to retrieve second user interface description 114. Second user interface description 114 includes second object definitions 116, position data 118, and second reference templates 120. Referring to FIG. 4, application service 18 (in particular interface description manager 50 of the application 46 associated with address 108) assembles or selects second user interface description 114 based on the state data used to populate reference template 106. Using the second user interface description a second user interface (not shown) is caused to be displayed.

CONCLUSION: The diagrams of FIGS. 1-4 show the architecture, functionality, and operation of various embodiments. Various components illustrated in FIGS. 1-4 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 5-6 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An apparatus, comprising a builder, template engine, and an assembler, wherein:
   the builder is configured to process a first user interface description to cause the display of a first user interface;
   the template engine is operable to identify a reference template associated with an object selected from the first user interface;
   the assembler is operable to assemble a request from the identified reference template and state data corresponding to the reference template;
   the builder is operable to process a second user interface description retrieved using the request to cause the display of a second user interface; and
   each user interface description defines a plurality of objects to be displayed and a plurality of reference templates each associated with a different one of the first plurality of objects, each reference template identifying corresponding state data to be added to the reference template to generate a request upon selection of that reference template's associated object.

2. The apparatus of claim 1, wherein the state data used by assembler to assemble the request is to be used to select or generate the user interface description retrieved using the request.

3. The apparatus of claim 1, wherein the request is a request for a network service to communicate a job to the apparatus, the apparatus further comprising a job engine configured to receive and process the job to produce an output.

4. The apparatus of claim 3, wherein the state data used to assemble the request is to be used to generate the job communicated to the apparatus.

5. The apparatus of claim 3, wherein the job is a print job.

6. The apparatus of claim 1, wherein the identified reference template is a first reference template, the assemble request is a first request, and wherein:
   the template engine is operable to identify a second reference template associated with an object selected from the second user interface;
   the assembler is operable to assemble a second request from the identified second reference template and state data corresponding to the second reference template; and
   the builder is operable to process a third user interface description retrieved using the second request to cause the display of a third user interface.

7. A non-transitory computer readable medium having instructions that when executed cause the implementation of a method, the method comprising:
   processing a first user interface description to cause the display of a first user interface;
   identifying a reference template associated with an object selected from the first user interface;
   assembling a request from the identified reference template and state data corresponding to the reference template; and
   processing a second user interface description retrieved using the request to cause the display of a second user interface;
   wherein each user interface description defines a plurality of objects to be displayed and a plurality of reference templates each associated with a different one of the first plurality of objects, each reference template identifying corresponding state data to be added to the reference template to generate a request upon selection of that reference template's associated object.

8. The medium of claim 7, wherein the state data used by assembler to assemble the request is to be used to select or generate the user interface description retrieved using the request.

9. The medium of claim 7, wherein the request is a request for a network service to communicate a job to the apparatus, the method further comprising receiving and processing the job to produce an output.

10. The medium of claim 9, wherein the state data used to assemble the request is to be used to generate the job communicated to the apparatus.

11. The medium of claim 9, wherein the job is a print job.

12. The medium of claim 7, wherein the identified reference template is a first reference template, the assembled request is a first request, the method further comprising:

identifying a second reference template associated with an object selected from the second user interface;

assembling a second request from the identified second reference template and state data corresponding to the second reference template; and processing a third user interface description retrieved using the second request to cause the display of a third user interface.

13. A system comprising an interface description manager and a device interface, wherein:

the device interface is configured to receive a request assembled by a device from a first reference template and state data corresponding to the first reference template;

the interface description manager is configured to acquire a user interface description compatible with the state data, the user interface description defining a plurality of objects and a plurality of second reference templates, each second reference template being associated with a different one of the objects; and the device interface is operable to cause the device to process the user interface description to a display a user interface having the defined objects.

14. The system of claim 13, wherein the interface description manager is configured to acquire the user interface description by retrieving the user interface description from a cache or assembling the user interface description if not available in the cache.

15. The system of claim 13, wherein the request is a first request, the user interface is a first user interface, the plurality of objects are a plurality of first objects, the state data is first state data, and wherein:

the device interface is configured to receive a second request assembled by the device from one of the second reference templates associated with an object selected from the fist user interface and second state data corresponding to that one of the second reference templates, the interface description manager is operable to acquire a second user interface description compatible with the second state data, the second user interface description defining a plurality of second objects and a plurality of third reference templates, each third reference template being associated with a different one of the second objects; and the device interface is operable to cause the device to process the second user interface description to a display a second user interface having the defined second objects.

16. The system of claim 13, further comprising a job manager configured to acquire job data corresponding to the request and cause the job data to be processed to generate a job to be communicated to the device.

17. The system of claim 16, wherein the job manager is configured to cause the job data to be processed to generate a job that is compatible with the state data included in the request.

18. The system of claim 17, wherein the device is a printer and the job is a print job to be delivered to the printer.

* * * * *

UNITED STATES PATENT AND TRADEMARK OFFICE
CERTIFICATE OF CORRECTION

PATENT NO. : 8,705,052 B2  
APPLICATION NO. : 12/759856  
DATED : April 22, 2014  
INVENTOR(S) : Jacob Refstrup et al.

It is certified that error appears in the above-identified patent and that said Letters Patent is hereby corrected as shown below:

On the Title page, in item (75), Inventors, in column 1, line 6, delete "Bosamlya" and insert -- Bosamiya --, therefor.

In the Claims

In column 10, line 8, in Claim 15, delete "fist" and insert -- first --, therefor.

Signed and Sealed this  
Twenty-ninth Day of September, 2015

Michelle K. Lee  
*Director of the United States Patent and Trademark Office*